United States Patent Office 3,313,649
Patented Apr. 11, 1967

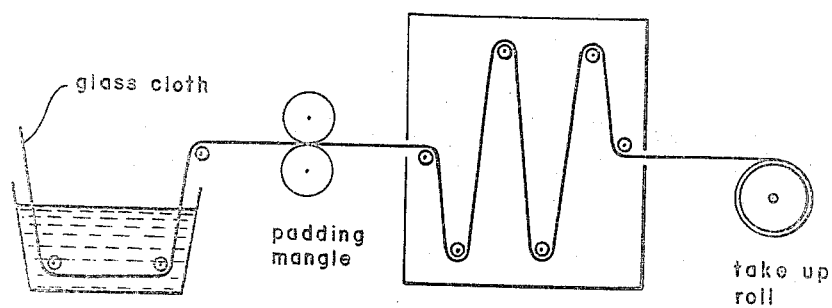

3,313,649
DYED AND PRINTED GLASS FIBERS AND A PROCESS FOR DYEING AND PRINTING GLASS FIBERS
Michele Vescia and Wolfgang Schwindt, Ludwigshafen (Rhine), Werner Dietrich, Mannheim, Ulrich Perkuhn, Ludwigshafen (Rhine), Gerhard Faulhaber, Mannheim, and Hans Wolf and Hans Wilhelm, Ludwigshafen (Rhine), Germany, assignors to Badische Anilin- & Soda-Fabrik Aktiengesellschaft, Ludwigshafen (Rhine), Germany
Filed Dec. 9, 1964, Ser. No. 417,230
Claims priority, application Germany, Dec. 14, 1963, B 74,667
8 Claims. (Cl. 117—126)

This invention relates to dyed or printed glass fibers. The invention also relates to the dyeing and printing of glass fibers.

It is known that fibrous material may be dyed and printed with pigments using as binders copolymers bearing, as side chains, hydrocarbon radicals in which a hydroxyl group and a halogen atom are attached to adjacent carbon atoms. The dyeings and prints are fixed at elevated temperature by means of agents which eliminate hydrogen halide. In this way it is also possible to produce dyeings and prints on glass fibers with good results.

It is also known that glass fibers can be satisfactorily dyed with pigments and binders in combination with siloxanes of defined composition. The preferred binders are copolymers which can be fixed in an acid medium. In this method, the glass fibers provided with the copolymer and pigment are given at intermediate drying and treated with the siloxane in an additional operation.

It is an object of the invention to provide dyed or printed glass fibers which exhibit improved fastness to rubbing. Another object of the invention is the production of dyed and printed glass fibers having improved wash fastness.

We have found that dyeings and prints having particularly good fastness properties with respect to rubbing and washing are obtained on glass fibers in a very economical way with pigments and/or dyes capable of forming covalent bonds by using as a binder a film-forming polymer which becomes fixed under the influence of proton acceptors, and using an agent having hydrophobic action to promote adhesion between the binder and the surface of the glass.

Glass fibers, which may be present as such or mixed with other fibers, for example in the form of fabric, which have been treated with the said components, with dyes and if desired with auxiliaries for fixation, are freed from water and/or organic solvents by drying and heated advantageously to temperatures in the range of from 90° to 200° C. to fix the polymer.

The invention is further illustrated by the accompanying drawing in the form of a schematic flow sheet showing one embodiment of the process in which a glass cloth is first passed through a bath of the padding liquor containing the essential components, conducted through a padding mangle, then dried and cured in a heated chamber and finally drawn off onto a take up roll. This embodiment is further illustrated in Examples 1 and 2 below.

Examples of film-forming polymers which can be fixed under the influence of proton acceptors are high molecular weight compounds having groups which, for example by means of alkalies or under the influence of other auxiliaries having appropriate action, can enter into covalent bonds with themselevs or with other groups, for example amino groups or hydroxyl groups. These polymers are preferably copolymers bearing hydrocarbon radicals as side chains in which a hydrovyl group and a halogen atom are attached to two adjacent carbon atoms. Among these, those copolymers are particularly suitable for the process of this invention which are insoluble in water and which may be made into adequately stable dispersions for use or which are obtained in dispersed form in their production.

For the synthesis of the copolymers, monomers are particularly suitable which yield copolymers which are soft and elastic at room temperature, for example vinyl esters of carboxylic acids having three or more carbon atoms, such as vinyl propionate, esters of acrylic and methacrylic acids, for example methyl acrylate, ethyl acrylate, butyl acrylate and butyl methacrylate, and butadiene and its homologs. These are copolymerized alone or mixed with each other or with other monomers and in any case with the monomers capable of being fixed by proton acceptors, for example with maleic esters, fumaric esters, vinyl ethers, vinyl ketones, styrene, vinyl chloride, vinylidene chloride, vinyl acetate, acrylonitrile and methyl methacrylate. Small amounts of water-soluble polymerizable compounds, such as acrylic acid, vinylpyrrolidone, vinylimidazole or amides of unsaturated acids, may also be used as comonomers. Examples of comonomers containing hydroxyl groups and halogen atoms attached to adjacent carbon atoms are compounds containing chlorohydrin groups and having at least one polymerizable double bond, as for example esters of $\alpha,\beta$-unsaturated organic acids, such as acrylic acid or methacrylic acid, with polyhydric alcohols which have a halogen atom in $\alpha$-position to a free hydroxyl group, for example with 3-chloropropanediol-(1,2), (2,3) - dichlorobutanediol - (1,4), 3 - chlorobutanetriol-(1,2,4), (1,4)-dichlorobutanediol-(2,3), 3-chloro-2-methylpropanediol-(1,2) or 3-chloro-2-chloromethylpropanediol-(1,2).

2-hydroxy-3-chloropropyl acrylate is particularly easily accessible and its use is of special technical interest.

The following special rules may therefore be postulated for the copolymers to be used according to this invention: In order that the copolymers may be fixable under the influence of alkalies, they are prepared with monomers which bear a hydroxyl group and a chlorine atom on two adjacent carbon atoms. These monomers are preferably esters of acrylic or methacrylic acid with alcohols having three or four carbon atoms, which after they have been esterified still contain at least one hydroxyl group adjacent to a chlorine atom. More than one chlorine atom may be present. In order that the copolymers may be soft and elastic, they are also prepared from monomers obtained by esterification of an unsaturated acid with an alcohol having one to six carbon atoms. Esters of acrylic and methacrylic acid are preferred. Vinyl esters of carboxylic acids having three or more carbon atoms or butadiene may also be used as monomers for the production of softer copolymers. In some cases it may be recommendable also to use for the production of the copolymers at least one further comonomer so that a copolymer is obtained which can be dispersed in a very stable manner. These comonomers may themselves be water-soluble. The property of water-solubility is however not an essential condition in these comonomers, but they should preferably be polar. Examples of comonomers of this type are: acrylonitrile, vinyl chloride, vinylpyrrolidone, maleic acid, vinyl acetate, and styrene. An expert in the polymer field will be able to produce film-forming copolymers for the purpose of the present invention without knowledge of this list and without the exercise of inventive ingenuity.

The amounts of monomers containing on two adjacent carbon atoms a hydroxyl group and a halogen atom (preferably a chlorohydrin) which are used for synthesis of the copolymers depend on the other monomers which are used to make up the copolymer and on the effect with which it is desired to dye or print the glass fibers. Generally from 0.5 to 30%, preferably from 2 to 15% by weight of these comonomers (with reference to the total amount of monomers) is incorporated into the copolymer. It is advantageous to use emulsion polymerization. It may be carried out in a conventional way using anionic, cationic or nonionic interface-active compounds or protective colloids. In this connection, the interface-active compounds are often called soaps. For dyeing by the process according to this invention, those polymers are preferred which have been prepared in the presence of cation-active emulsifiers as dispersing agents or which contain the same.

The proton acceptors (i.e. the auxiliaries for fixation) may be for example alkali hydroxides, for example sodium hydroxide or potassium hydroxide, alkali metal salts of weak acids, for example potassium or sodium carbonate, or compounds which split off alkali at elevated temperautre under fixing conditions, for example potassium or sodium bicarbonate. Ammonia or organic bases, for example water-soluble amines, such as lower aliphatic amines, particularly alkylamines or hydroxyalkylamines with a total of 1 to 6 carbon atoms, e.g., triethanolamine, may also be used as auxiliaries for fixation. With some kinds of glass it is not necessary to co-employ auxiliaries for fixation because of the alkali (i.e., the proton acceptor) required for fixing the polymer is already available in adequate amounts in the glass surface.

Compounds of a great variety of types which have hydrophobic action may be used for promoting adhesion between the polymer and the glass surface. For example hydrocarbons of sufficiently high molecular weight, such as paraffin wax and other waxes, are suitable. Other organic compounds having a hydrophobic action and which are preferred as adhesion promoters are organic silicon compounds, preferably aminosilanes.

Inorganic or organic pigments which are in readily disperable form, for example as aqueous pigment pastes containing emulsifier, may be used as dyes in the conventional methods for pigment dyeing and pigment printing. Water-soluble dyes are also suitable for dyeing and printing by the process of this invention provided that under the conditions of use they are capable of reacting, directly or via auxiliaries, with the polymers and if desired with the adhesion promoters, forming covalent bonds. Reactive dyes are an example of this type of dye. These are colored compounds which contain in the molecule groups which under the physical and chemical conditions prevailing in dyeing processes enter into covalent bonds with cellulose by way of its hydroxyl groups. Dyes of this type are defined by J. Wegmann in the periodical "Textil-Praxis," October 1958, on page 1056. Reactive dyes may belong to the classes of anthraquinone, azo, disazo, methine, azaporphin, oxazine and triazine dyes. Examples of water-soluble dyes which are capable of reacting via auxiliary compounds are those which contain reactive hydrogen atoms in the molecule. Compounds which are at least bifunctional, for example triacrylformal, may be used as auxiliary compounds. Auxiliary compounds are preferred which under the influence of alkalies react with the dye and with the polymer or other substances containing reactive groups.

In general about 0.1 to 10%, preferably 0.2 to 5%, by weight of the adhesion promoter is required with reference to the dye liquor or print paste or the padding liquor which is used for aftertreatment. Common application of at least the polymer, the dye and the adhesion promoter is preferred.

Appreciable fastness of the dyeing and prints is achieved with as little as 0.2 to 1% by weight of adhesion promoter if it is contained in the dye liquor or print paste. If the adhesion promoter is applied subsequently, it is advantageous to use larger amounts, for example 2 to 5% by weight.

In addition to the dispersed polymer, the dye, the adhesion promoter and, if necessary, further agents, the dye liquors and print pastes may also contain other additives, for example emulsifiers, plasticizers, protective colloids, thickeners, resins such as aminoplast-forming compounds which are curable under the fixation conditions, fillers and other auxiliaries. It is easy to determine by previous experiment what additives are compatible with the substances which are necessarily present and fulfill the wishes of the processer and user as regards quality of the dyeings and prints.

For technical and economical reasons, it is preferred to use aqueous dye liquors and print pastes, but organic solvents may be coemployed. For example it is advantageous when preparing print pastes to use emulsion thickenings which have been produced by incorporating liquid hydrocarbons, for example kerosene, in known manner into water in the presence of surfactants.

Some directions for dyeing and printing glass fibers according to this invention will now be given. For example the polymer, pigment and/or the soluble dye, the adhesion promoter and if necessary an alkaline reacting agent and/or an auxiliary compound for fixing the compound may be applied together in a dye liquor or as a print paste. The product is then dried at moderately elevated temperature, for example in the range of from 40° to 80° C., and finally fixed for some minutes at temperatures in the range of 90° to 200° C. The said temperature limits are available. It is possible to dry at room temperature; a longer period is accordingly necessary. It is also possible to dry at temperature of about 100° C. or above 100° C.; drying continues until the water and/or organic solvent has completely volatilized; fixation then sets in so that drying and fixation take place in one operation. It is also possible to effect fixation below 90° C. by corresponding lengthening of the fixation period; on the other hand temperatures of more than 200° C. may be used provided the dye and the other agents will withstand the temperatures involved. Conventional fixation conditions are for example five minutes at 150° C. or three minutes at 180° C.

The method described above may be modified in various ways. It is not necessary for the dye liquor or print paste already to contain the polymer, the adhesion promoter and any alkaline-reacting agent. These substances, either singly or in combination, may be used subsequently. For example it is possible to use a dye liquor or print paste which, in addition to pigment and/or water-soluble dye, also contains the polymer and any alkaline reagent. After the glass has been dyed or printed and dried it is padded with a liquor which contains the adhesion promoter, dried and fixed. Dispersions of the polymer or any alkaline reacting agent which is coemployed may also be applied subsequently.

Glass fibers, particularly glass cloths, are often provided with a finish. For dyeing and printing by the method according to this invention, glass fibers and glass cloth is used which has been treated for a short time at comparatively elevated temperature but has not otherwise been prepared. On the other hand glass cloth may be used which has been provided with a conventional preparation for improving mechanical strength. It is to be remarked that the above-mentioned hydrophobic agents also considerably improve the adhesion of the binder to the substrate and consequently the fastness in said latter case.

The invention is further illustrated by the following examples. Parts and percentages in the examples are by weight.

*Example 1*

A pad liquor is prepared from 5 parts of an about 30% aqueous pigment paste of copper phthalocyanine, 60 parts of an about 40% aqueous dispersion of a copolymer of 87% of butyl acrylate, 9% of acrylonitrile and 4% of 2-hydroxy-3-chloropropyl acrylate, 20 parts of triethanolamine, 1 part of an aminosilane having the formula $(C_2H_5O)_3—Si(CH_2)_3—NH_2$ and 914 parts of water. Glass cloth which has had a conventional pretreatment, i.e., has been heated to about 650° C. in order to remove the preparation applied subsequently to melt spinning, is padded with a mangle expression of 50 to 60%, dried and fixed for three minutes at 180° C. A deep dyeing having a soft handle and very good washing and rubbing fastness is obtained.

*Example 2*

Dyeing is carried out with a pad liquor comprising 8 parts of an about 30% aqueous pigment paste of the azo dye from 2 moles of 2,4-dichloroaniline+1 mole of 3,3'-dimethyl-4,4'-diacetoacetylaminodiphenyl, 2 parts of an about 70% solution of a partly etherified urea-formaldehyde precondensate, 100 parts of an about 40% dispersion of a copolymer of 70% of butyl acrylate, 25% of ethyl acrylate and 5% of 2,3-dichloro-4-hydroxybutyl methacrylate, 20 parts of sodium bicarbonate, 5 parts of an about 70% paraffin emulsion and 865 parts of water. Fixation is effected for five minutes at 150° C. The properties of the glass fibers obtained according to this and the following examples are similar to those of the glass fibers obtained according to the foregoing example.

*Example 3*

A print paste is prepared from 20 parts of an about 30% pigment paste of a suitable type of carbon black, 935 parts of the print emulsion described below, 40 parts of an about 25% aqueous solution of potassium bicarbonate and 5 parts of an aminosilane having the formula

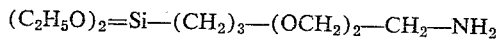

A glass cloth is printed with this print paste, dried and then fixed for five minutes at 150° C. in hot air. The print obtained has a soft feel and outstanding washing and rubbing fastness.

The print emulsion used is obtained by stirring 645 parts of white spirit in a high speed stirrer at about 3000 r.p.m. into a mixture of 90 parts of water, 50 parts of a 20% solution of the adduct of 25 moles of ethylene oxide to 1 mole of sperm oil alcohol, 40 parts of a 7% methyl cellulose, 25 parts of glycerin and 150 parts of an about 40% aqueous dispersion of a copolymer of 60% of butyl acrylate, 20% of acrylonitrile, 9% of methyl methacrylate, 1% of acrylic acid and 10% of 2-hydroxy-3-chloropropyl acrylate.

*Example 4*

180 parts of an about 40% aqueous dispersion of a copolymer of 60% of butyl acrylate, 25% of acrylonitrile, and 15% of 2-hydroxy-3-chloropropyl acrylate is mixed with 140 parts of water, 20 parts of the sodium salt of the acid sulfuric acid ester of the adduct of 80 moles of ethylene oxide to 1 mole of sperm oil alcohol and 60 parts of 6% tragacanth and then 600 parts of kerosene is stirred in a high speed stirrer. A print paste is prepared from 955 parts of this emulsion, 25 parts of an about 30% pigment paste of the azo dye from 3-amino-4-methoxybenzenesulfonic acid diethylamide and 2,3-oxynaphthoic acid-3'-chloro-4',6'-dimethoxyanilide, 5 parts of an about 70% aqueous solution of a partly etherified urea-formaldehyde precondensate and 15 parts of an about 30% paraffin emulsion. A glass cloth containing itself an adequate amount of alkali is printed with the resultant print paste. It is then dried and fixed for three minutes at 180° C. in hot air.

*Example 5*

A print emulsion is made as described in Example 3 from an about 40% aqueous dispersion of a copolymer of 20% of butadiene, 20% of isobutyl acrylate, 25% of acrylonitrile and 15% of 2,3-dichloro-4-hydroxybutyl methacrylate. A print paste is prepared from 950 parts of this print emulsion, 25 parts of an about 30% pigment paste of chlorinated copper phthalocyanine and 25 parts of triethanolamine. Glass cloth is printed with this print paste and dried at 90° to 100° C. It is then padded with a 5% aqueous solution of the aminosilane specified in Example 1 or 3, dried and fixed for three minutes at 160° C.

*Example 6*

30 parts of the dye (obtained by coupling diazotized sulfuric acid ester of β-hydroxypropionic-m-anilide with 1,4-naphtholsulfonic acid) is dissolved in 150 parts of hot water, and then 150 parts of an about 40% aqueous dispersion of a copolymer of 22% of vinyl propionate, 70% of ethyl acrylate and 8% of 2-hydroxy-3-chloropropyl acrylate, 30 parts of potassium carbonate and 635 parts of a thickener emulsion and 5 parts of an aminosilane having the formula $(C_2H_5O)_3—Si—(CH_2)_3—NH_2$ are added. The thickener emulsion is obtained by stirring 600 parts of kerosene in a high speed stirrer into a mixture of 90 parts of water, 10 parts of a 20% solution of the adduct of 25 moles of ethylene oxide to 1 mole of sperm oil alcohol and 300 parts of 4% alginate. Glass cloth is printed with the print paste, dried, steamed at about 100° C. for eight minutes and rinsed. Deep colored prints having good rubbing and washing fastness are obtained.

We claim:

1. A method of imparting color to glass fibers which comprises: applying to the glass fiber an aqueous dye composition containing
   (a) a pigment dye,
   (b) as a binder, a film-forming water-dispersable addition copolymer bearing side chains which contain a hydrocarbon radical of 3 to 4 carbon atoms in which a hydroxy group and a chlorine atom are substituted on vicinal carbon atoms, and
   (c) 0.1 to 10% by weight with reference to the aqueous dye composition of an aminosilane having a hydrophobic action on the glass fiber and promoting adhesion between the copolymer and the glass surface;
and drying and fixing the applied composition by heating it at a temperature above 90° C. in the presence of an alkaline reacting agent.

2. A colored glass fiber product obtained by the process claimed in claim 1.

3. A method as claimed in claim 1 wherein the dye liquor contains as a binder a film-forming water dispersable addition copolymer of
   (a) 0.5 to 30% by weight, with reference to the total amount of monomers, of an ester of a copolymerizable α,β-ethylenically-unsaturated acid with a polyhydric alcohol of 3 to 4 carbon atoms in which a chlorine atom is substituted in vicinal position to a free hydroxy group;
   (b) at least one monomer selected from the group consisting of butadiene, acrylic and methacrylic acid esters of alcohols having 1 to 6 carbon atoms, and vinyl esters of carboxylic acids having at least 3 carbon atoms; and
   (c) at least one copolymerizable ethylenically-unsaturated polar monomer.

4. A method as claimed in claim 1 wherein the aqueous composition is dried and fixed in the presence of an alkaline reacting compound selected from the class consisting of an alkali hydroxide, and alkali metal salt of a weak acid, ammonia and a compound which splits off one of these alkaline reacting compounds at a temperature above 90° C.

5. A method as claimed in claim 1 wherein the aqueous dye composition is dried and fixed in the presence of a water-soluble amine selected from the class consisting of alkylamines and hydroxyalkylamines having 1 to 6 carbon atoms.

6. A method as claimed in claim 1 wherein the aqueous dye composition contains as a binder a film-forming water-dispersable addition copolymer of
 (a) 0.5 to 30% by weight with reference to the total amount of monomers, of an ester of a copolymerizable $\alpha,\beta$-ethylenically-unsaturated acid with a polyhydric alcohol of 3 to 4 carbon atoms in which a chlorine atom is substituted in vicinal position to a free hydroxy group; and
 (b) at least one monomer selected from the group consisting of butadiene, acrylic and methacrylic acid esters of alcohols having 1 to 6 carbon atoms, and vinyl esters of carboxylic acids having at least 3 carbon atoms.

7. A method as claimed in claim 6, wherein the monomeric component (a) is 3-chloro-2-hydroxypropyl acrylate.

8. A method as claimed in claim 6, wherein the monomeric component (a) is 2,3-dichloro-4-hydroxybutyl methacrylate.

References Cited by the Examiner

UNITED STATES PATENTS

| 2,955,053 | 10/1960 | Roth | 117—126 |
| 2,971,864 | 2/1961 | Speir | 117—126 |

FOREIGN PATENTS 916,699  6/1961  Great Britain.

RALPH S. KENDALL, *Primary Examiner.*

ALFRED L. LEAVITT, *Examiner.*

W. L. SOFFIAN, H. COHEN, *Assistant Examiners.*

UNITED STATES PATENT OFFICE
CERTIFICATE OF CORRECTION

Patent No. 3,313,649            April 11, 1967

Michele Vescia et al.

It is hereby certified that error appears in the above numbered patent requiring correction and that the said Letters Patent should read as corrected below.

Column 4, line 33, for "available" read -- variable --.

Signed and sealed this 26th day of December 1967.

(SEAL)
Attest:

Edward M. Fletcher, Jr.            EDWARD J. BRENNER
Attesting Officer            Commissioner of Patents